(12) United States Patent
Park

(10) Patent No.: US 8,503,350 B2
(45) Date of Patent: Aug. 6, 2013

(54) WIRELESS COMMUNICATION SYSTEM

(75) Inventor: Gwang Hoon Park, Sungnam-si (KR)

(73) Assignee: University-Industry Cooperation Group of Kyung Hee University, Yongin-Si (KR)

( * ) Notice: Subject to any disclaimer, the term of this patent is extended or adjusted under 35 U.S.C. 154(b) by 566 days.

(21) Appl. No.: 12/540,724

(22) Filed: Aug. 13, 2009

(65) Prior Publication Data

US 2011/0038301 A1 Feb. 17, 2011

(51) Int. Cl.
*H04J 1/10* (2006.01)
(52) U.S. Cl.
USPC ............................ 370/315; 370/492; 370/432
(58) Field of Classification Search
USPC ................. 370/315, 326, 343, 310, 312, 329, 370/293, 406, 431, 432, 480, 485, 492; 455/11.1, 426.1, 426.2, 414, 403, 422.1, 455/466, 550, 517, 445
See application file for complete search history.

(56) References Cited

U.S. PATENT DOCUMENTS

| | | | |
|---|---|---|---|
| 7,224,936 B2 * | 5/2007 | Pearson | 455/11.1 |
| 2005/0227616 A1* | 10/2005 | Takatani et al. | 455/11.1 |
| 2007/0121521 A1* | 5/2007 | D'Amico et al. | 370/252 |
| 2008/0032697 A1* | 2/2008 | Sommer | 455/445 |

OTHER PUBLICATIONS

Aria Nosratinia, et al "Cooperative Communication in Wireless Networks" IEEE Communications Magazine, Oct. 2004; pp. 74-80.

* cited by examiner

*Primary Examiner* — Dady Chery
(74) *Attorney, Agent, or Firm* — Maschoff Brennan

(57) ABSTRACT

A communication method in a wireless communication system includes receiving information to determine whether or not to permit a relay of a communication between a first wireless station and a second wireless station, and relaying the communication based on at least the received information.

12 Claims, 8 Drawing Sheets

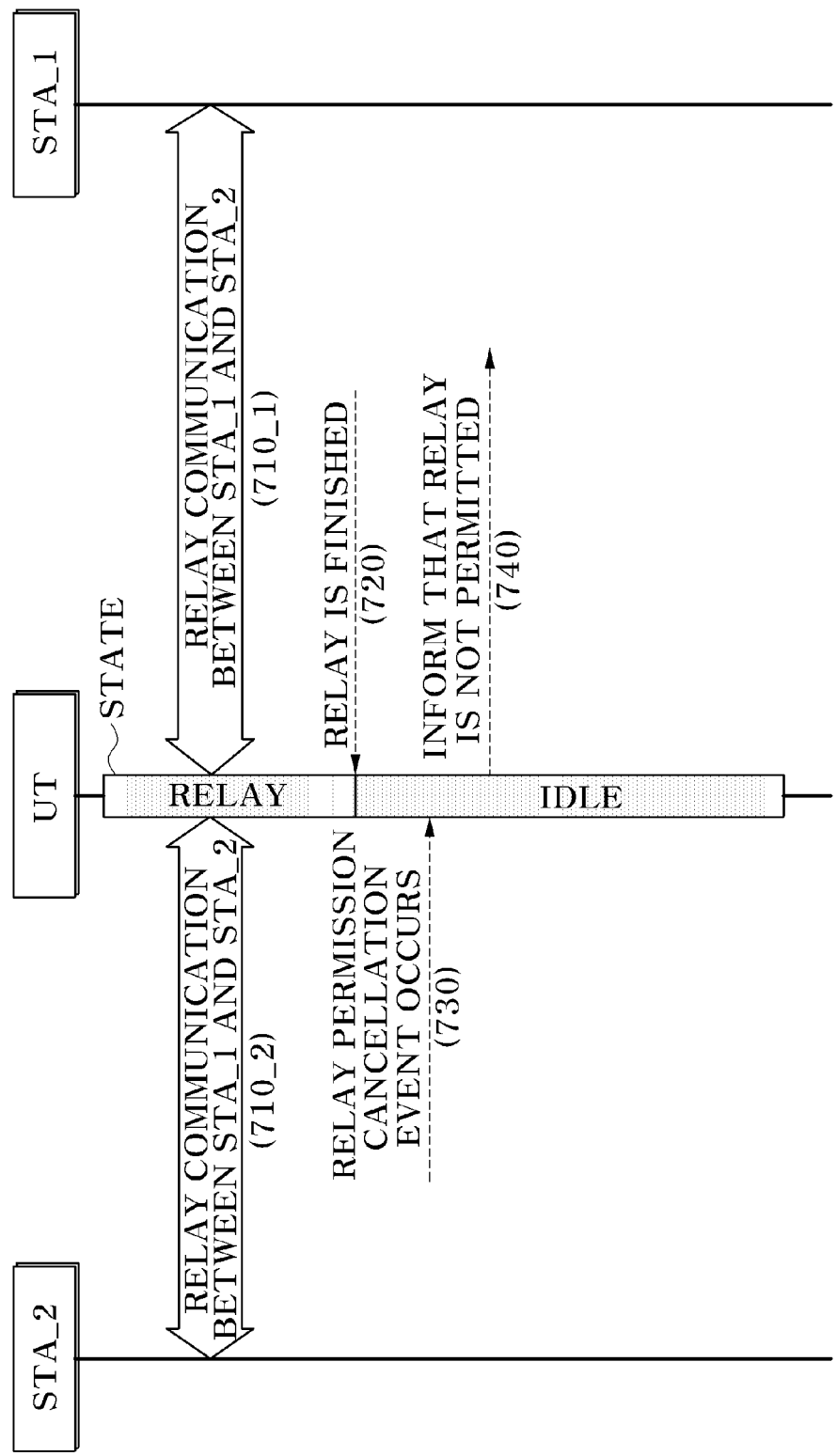

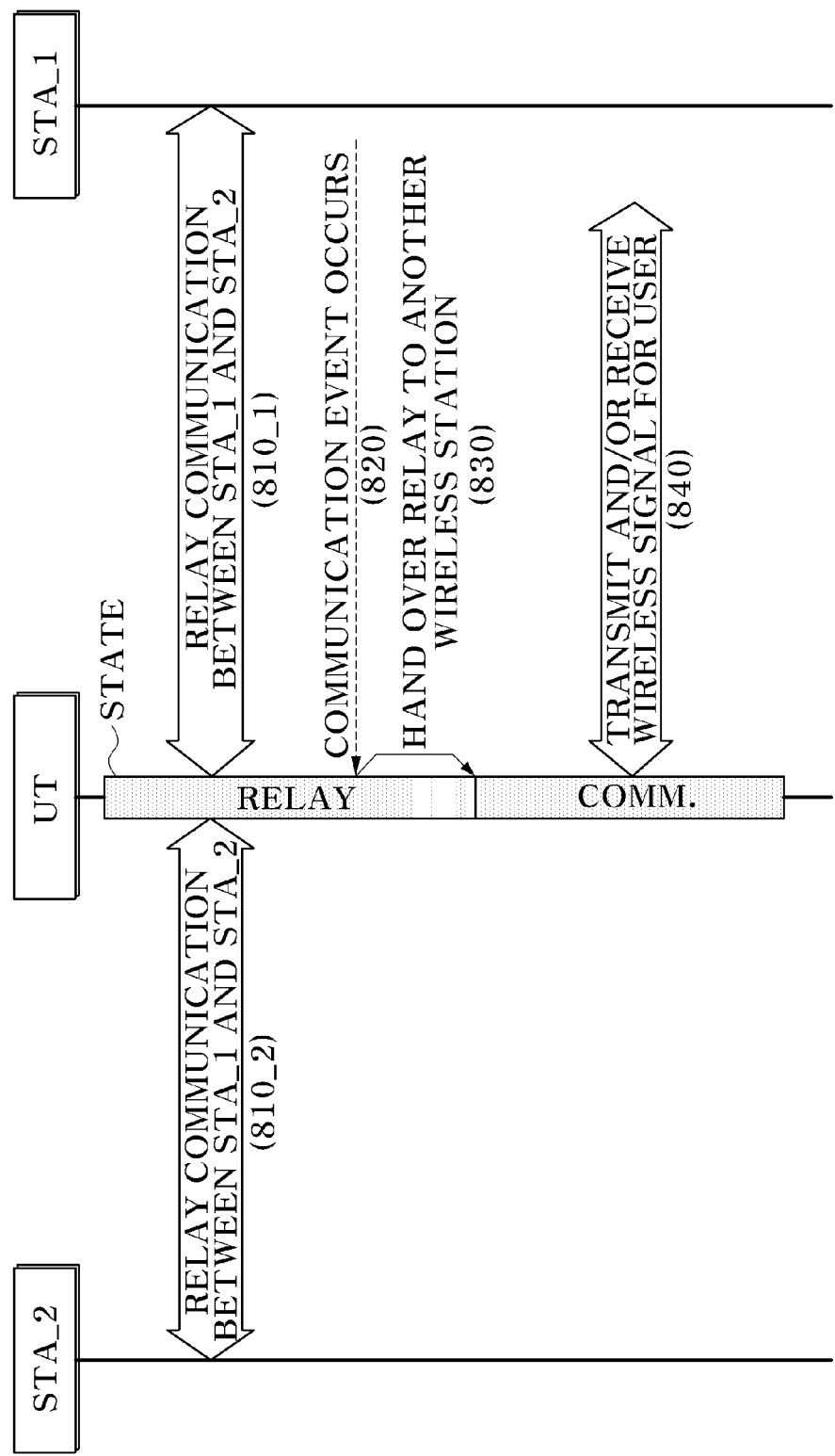

WIRELESS COMMUNICATION SYSTEM

BACKGROUND

Current wireless communication system environments include cellular communication systems, wireless local area networks (WLANs), and wireless metropolitan area networks (WMANs). These environments allow a user using a supported terminal or communication device to transmit and/or receive phone calls and various data.

BRIEF DESCRIPTION OF THE DRAWINGS

FIG. 7 shows a flow diagram of another illustrative embodiment of a communication method in a wireless communication system; and FIG. 8 shows a flow diagram of still another illustrative embodiment of a communication method in a wireless communication system.

DETAILED DESCRIPTION

Figure 1:
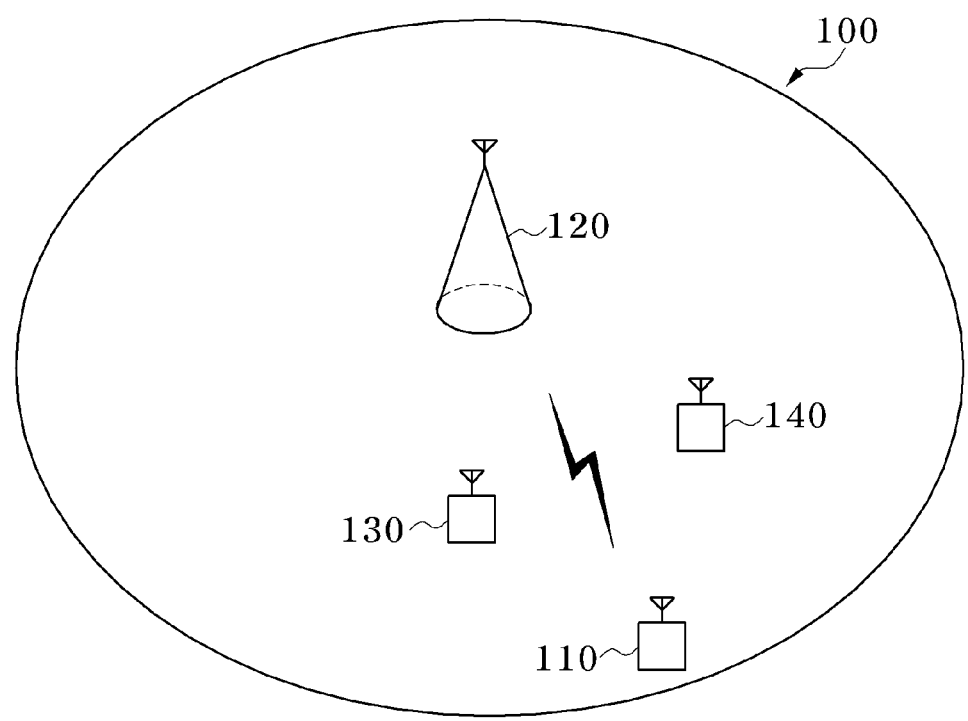
FIG. 1 shows a schematic diagram of an illustrative embodiment of a centralized communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated and designed in a wide variety of different configurations, all of which are explicitly contemplated herein.

In a wireless communication system, a wireless station can transmit and/or receive a wireless message or signal to and/or from another wireless station. In the discussion that follows, the terms "message" and "signal" will be interchangeably used for simplicity and ease of explanation. Wireless communication systems may be roughly classified as a centralized communication system, such as a cellular communication system or a wireless local area network (WLAN) in an infrastructure basic service set (BSS) mode, or as a decentralized communication system, such as an ad-hoc network system.

As used herein, the term "wireless station" includes a user terminal, such as a mobile phone or a wireless communication enabled laptop, or a central station, such as a base station for a cellular communication system or an access point of a WLAN. The term "and/or" may include any and all combinations of one or more of the associated listed items.

In one embodiment, a communication method in a wireless communication system includes receiving information to determine whether or not to permit a relay of a communication between a first wireless station and a second wireless station. The communication method also includes relaying the communication based on the received information.

In another embodiment, a communication method in a wireless communication system includes relaying a communication between a first wireless station and a second wireless station. The method also includes informing a user of an incentive for relaying the communication.

In still another embodiment, a user terminal in a wireless communication system includes a user interface configured to allow a user to input information used to determine whether or not to permit a relay. The user terminal also includes a transceiver configured to transmit or receive a signal, and a controller configured to relay a communication between a first wireless station and a second wireless station through the transceiver based on the information.

FIG. 1 shows a schematic diagram of an illustrative embodiment of a centralized communication system 100. As depicted, in centralized communication system 100, a first user terminal 110 communicates with a central station 120 to transmit and/or receive signals, for example, data such as a call or a packet, to and/or from a remote telecommunication device (not shown). The telecommunication device may be, for example, a server connected with central station 120 via a network, a second user terminal 130 in a service area of central station 120, a third terminal 140 in the service area of central station 120, or another user terminal located in another service area of another central station (not shown) which is connected with central station 120 via a network. As used herein, the phrase "a service area of a central station" generally refers to an area proximate to or around the central station where the central station can provide communication services to a telecommunication device located within the service area without the assistance or help from another central station.

In centralized communication system 100 of FIG. 1, first user terminal 110 may directly communicate with central station 120. Alternatively, first user terminal 110 may indirectly communicate with central station 120 via one or more other devices such as second user terminal 130 and/or third user terminal 140. In this indirect communication scheme, second user terminal 130 and/or third user terminal 140 may operate as relay stations (i.e., second user terminal 130 and/or third user terminal 140 may provide the relay functionality). By way of example, second user terminal 130 may operate as a relay terminal. Second user terminal 130 may receive a signal transmitted from central station 120 and transmit (i.e., relay) the signal to first user terminal 110. Second user terminal 130 may also receive a signal from first user terminal 110 and transmit the signal to central station 120. Such cooperative communication may be performed when a wireless link between first user terminal 110 and central station 120 is unavailable or becomes deteriorated, for example, due to shadowing, interference, and so on.

Figure 2:
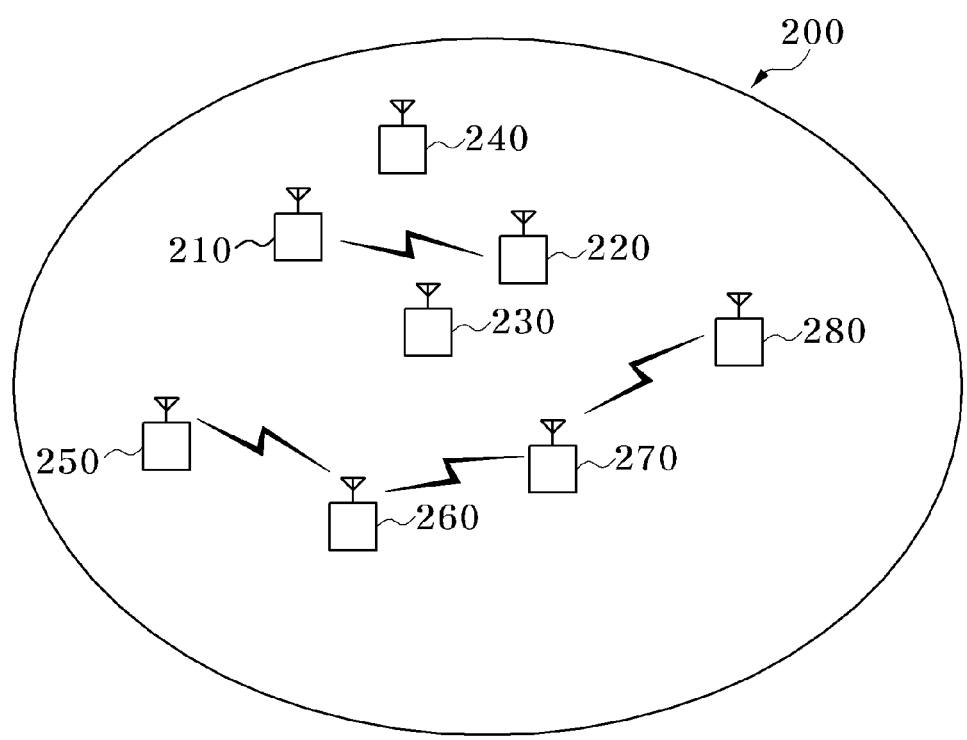
FIG. 2 shows a schematic diagram of an illustrative embodiment of a decentralized communication system.

FIG. 2 shows a schematic diagram of an illustrative embodiment of a decentralized communication system 200. In decentralized communication system 200, user terminals can communicate with a counterpart terminal without the assistance from a central station. Instead of communicating with the central station, user terminals may directly communicate with the counterpart terminal or indirectly communicate with the counterpart terminal through relay assistance from one or more other user terminals. As one example, as depicted in FIG. 2, a first user terminal 210 may directly communicate with a second user terminal 220 without the relay assistance from another user terminal such as a third user terminal 230, a fourth user terminal 240, etc. As another example, as depicted in FIG. 2, a fifth user terminal 250 may indirectly communicate with an eighth user terminal 280 utilizing relay assistance provided by one or more other user terminals such as a sixth user terminal 260 and a seventh user terminal 270.

Figure 3:
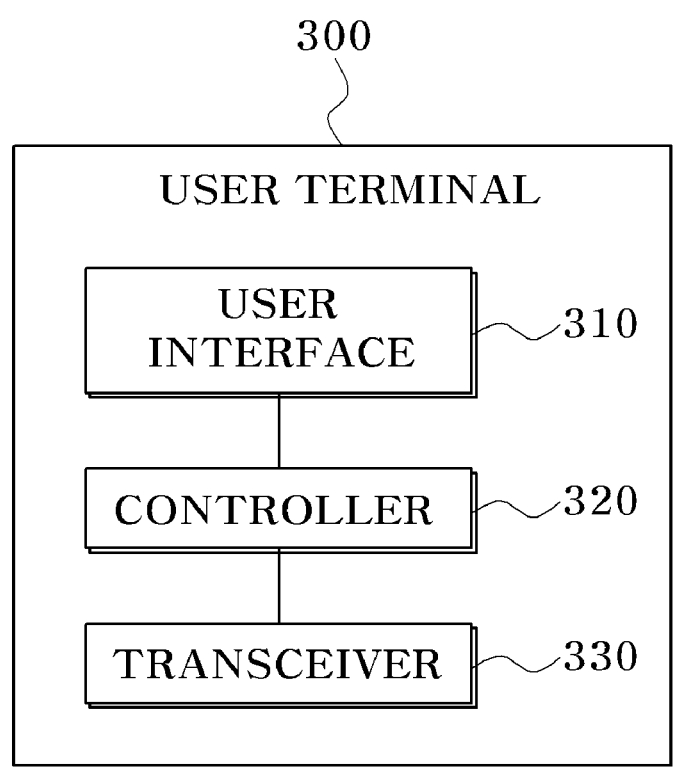
FIG. 3 shows a block diagram of an illustrative embodiment of a user terminal.

FIG. 3 shows a block diagram of an illustrative embodiment of a user terminal 300. User terminal 300 may be configured to operate in the centralized communication system illustrated in FIG. 1 or the decentralized communication system illustrated in FIG. 2. As depicted in FIG. 3, user terminal 300 may include a user interface 310, a controller 320, and a transceiver 330. Those of ordinary skill in the art will readily recognize that user terminal 300 may further include other various modules, such as a multimedia codec and/or a hard disk drive not shown in FIG. 3, according to the functional characteristics of user terminal 300.

User interface 310 provides a user with an environment suitable for use in communicating with user terminal 300, including inputting information for determining whether or not to permit a relay (i.e., information that is used to determine whether or not to permit relay). User interface 310 may include but is not limited to a keypad, a touch screen, or a dedicated key, and may also include a display panel such as a liquid crystal display (LCD) or a light-emitting diode (LED). As one example, a user may activate or inactivate a relay permission mode of user terminal 300 through user interface 310. By way of example, the user may activate the relay permission mode by selecting or operating a functional command in user interface 310. The relay permission mode indicates whether the relay function or feature is permitted on user terminal 300. In the relay permission mode, user terminal 300 may relay communications between communication devices. Alternatively, the user can inactivate the relay permission mode (e.g., a previously activated relay permission mode) by, for example, selecting or operating another functional command in user interface 310. As another example, a user may use user interface 310 to input a relay permission condition into user terminal 300 for relaying communications between communication devices. As used herein, the relay permission condition refers to one or more condition requirements under which the user terminal is to operate as a relay station. That is, as long as user terminal 300 satisfies the specified or input relay permission condition, user terminal 300 may operate as a relay station. The relay permission condition may include, for example but not limitation, at least one of available battery capacity, available communication time, or a time period of an idle state. By way of example, assuming that an available battery capacity or available communication time value was specified, user terminal 300 may relay communications between communication devices when (i.e., as long as) the remaining or available battery capacity or available communication time of user terminal 300 satisfies the specified or input relay permission condition (i.e., the specified available battery capacity value or available communication time value), respectively. In addition, assuming that an idle time period value was specified, user terminal 300 may relay communications between communication devices when (i.e., as long as) user terminal 300 has been idle for a period of time longer than the specified idle time period.

In another embodiment, user interface 310 may inform a user of an incentive offered or provided for allowing user terminal 300 to perform the relay function. By way of example, the incentive may be available free call time, available free data transmission capacity, a reduced communication fee rate, or credit points given in compensation for the relay, but is not limited thereto.

Controller 320 may control the state transitions of user terminal 300. By way of example, controller 320 may control user terminal 300 to be in one state among an idle state, a communication state, or a relay state. In one embodiment, controller 320 may set a flag to ACTIVE (e.g., set the flag to an ACTIVE value) when a user uses user interface 310 and activates the relay permission mode indicating that the relay function or feature is permitted through user terminal 300. Alternatively, controller 320 may set the flag to INACTIVE (e.g., set the flag to an INACTIVE value) when the user inactivates the relay permission mode. Controller 320 may initially set the flag to INACTIVE.

Controller 320 may set or modify the aforementioned flag based on a user specified relay permission condition. Controller 320 may periodically monitor user terminal 300 to determine whether one or more user specified relay permission conditions are satisfied. Controller 320 may alternatively or in addition monitor user terminal 300 prior to performing a relay operation to determine whether one or more user specified relay permission conditions are satisfied. For example, when the user uses user interface 310 and inputs or specifies the relay permission condition, controller 320 may monitor user terminal 300 to determine whether the specified relay permission condition is satisfied, and set the flag to either ACTIVE or INACTIVE based on the monitoring result. As one example, the relay permission condition may specify an available battery capacity or available communication time. In this case, when the available battery capacity or available communication time of user terminal 300 satisfies the specified relay permission condition, controller 320 may set or maintain the flag to ACTIVE. Alternatively, when the available battery capacity or available communication time of user terminal 300 does not satisfy the specified relay permission condition, controller 320 may set or maintain the flag to INACTIVE. As another example, the relay permission condition may specify an idle time period. In this case, when the user terminal 300 has been idle for a period of time longer than the specified idle time period, controller 320 may set or maintain the flag to ACTIVE. Alternatively, when user terminal 300 has not been idle for the specified idle time period, controller 320 may set or maintain the flag to INACTIVE.

Transceiver 330 facilitates or acts as a communications interface between user terminal 300 and the other modules including communication devices and networks. For example, transceiver 330 may transmit and/or receive a signal or signals to and/or from another wireless station including a user terminal, a central station, etc., to provide communication and/or relay functionality.

Figure 4:
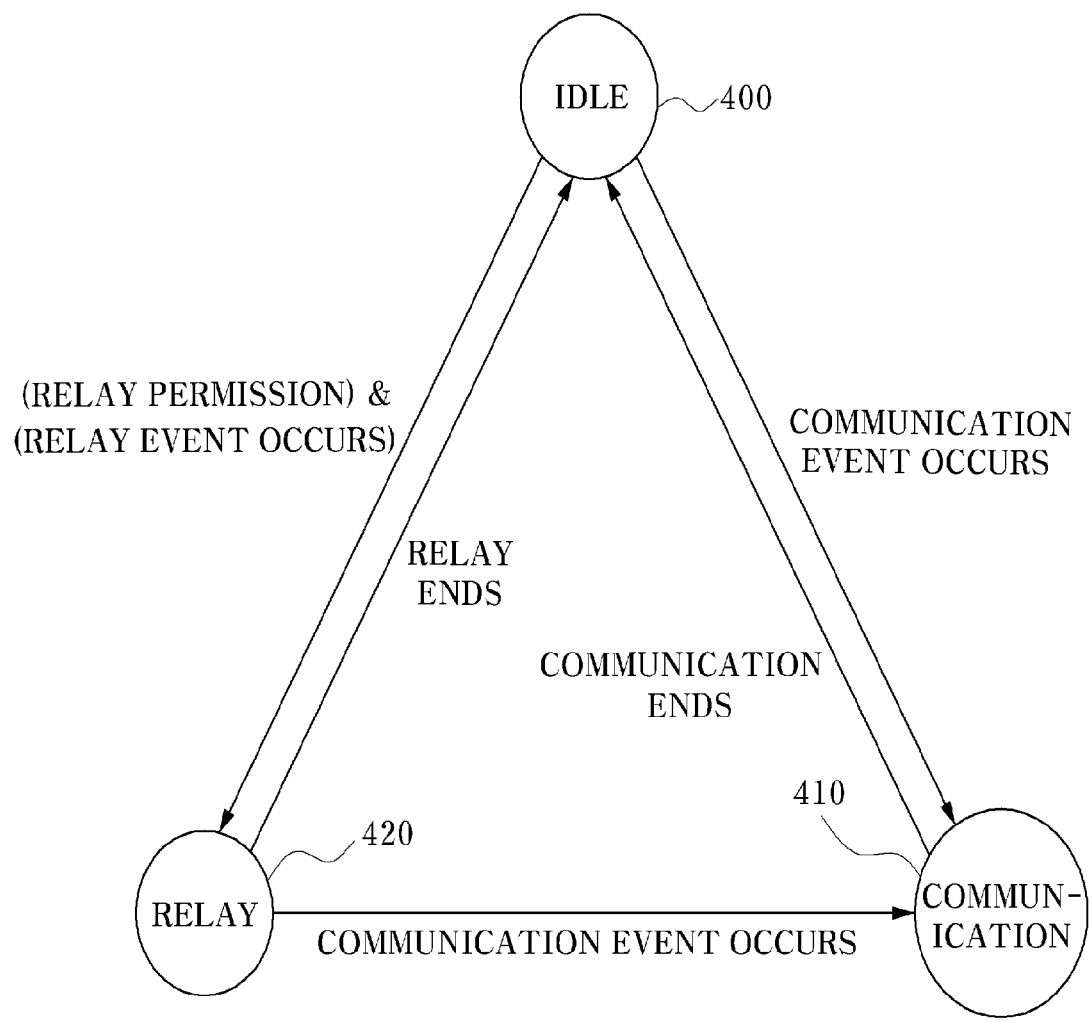
FIG. 4 shows a schematic diagram of an illustrative embodiment of state transitions of a user terminal.

FIG. 4 shows a schematic diagram of an illustrative embodiment of state transitions of a user terminal, such as user terminal 300. As depicted, user terminal 300 may initially be in an idle state 400. In idle state 400, user terminal 300 may monitor for an event that causes user terminal 300 to transition to a communication state 410 or a relay state 420.

By way of example, in response to a communication event while in idle state 400, controller 320 may switch the state of user terminal 300 from idle state 400 to communication state 410. Examples of the communication event include, without limitation, the transmission or reception of data by user terminal 300. While in communication state 410, user terminal 300 may communicate with another wireless station through transceiver 330. Upon completing the communication event, controller 320 may switch the state of user terminal 300 to idle state 400.

In response to a relay event while in idle state 400, controller 320 may switch the state of user terminal 300 from idle state 400 to relay state 420 based on the permissibility of the relay event. By way of example, the relay event may include reception of a relay request from another wireless station, and controller 320 may check to determine whether relay function or operation is permitted (e.g., whether the above-mentioned flag is set to ACTIVE). If relay function is permitted (e.g., flag is set to ACTIVE), controller 320 may switch the state of user terminal 300 to relay state 420. While in relay state 420, user terminal 300 may relay communications between other wireless stations through transceiver 330. Upon completing the relay event, controller 320 may switch the state of user terminal 300 to idle state 400.

In relay state 420, user terminal 300 may inform a user of an incentive offered or provided for allowing user terminal 300 to perform the relay function through user interface 310. In one embodiment, information regarding the incentive may be stored in a corresponding storage (not shown) of user terminal 300 such that the information may be provided, for example, subsequently to a communication network provider, or may be provided in real-time to a billing server of a communication network provider via a central station such as central station 120 as depicted in FIG. 1.

In response to a communication event while in relay state 420, controller 320 may switch the state of user terminal 300 from relay state 420 to communication state 410. In one embodiment, assuming that the communication event occurs during the middle of (i.e., while performing) a relay operation, controller 320 may switch the state to communication state 410 subsequent to completing the relay operation. For example, in the aforementioned scenario, controller 310 may switch the state to communicate state 410 subsequent to successfully transmitting the relay message or packets to a central station, such as central station 120 of FIG. 1, or another user terminal if operating in a centralized communication system, or to another user terminal if operating in a decentralized communication system. Upon completing the communication event, controller 320 may switch the state of user terminal 300 to idle state 400. Alternatively, controller 320 may toll or pause the relay operation, switch the state to communication state 410, perform the communication event, switch the state to relay state 420 (not shown in FIG. 4), and then resume the tolled or paused relay operation. Upon completing the relay operation, controller 320 may switch the state of user terminal 300 to idle state 400.

Figure 5:
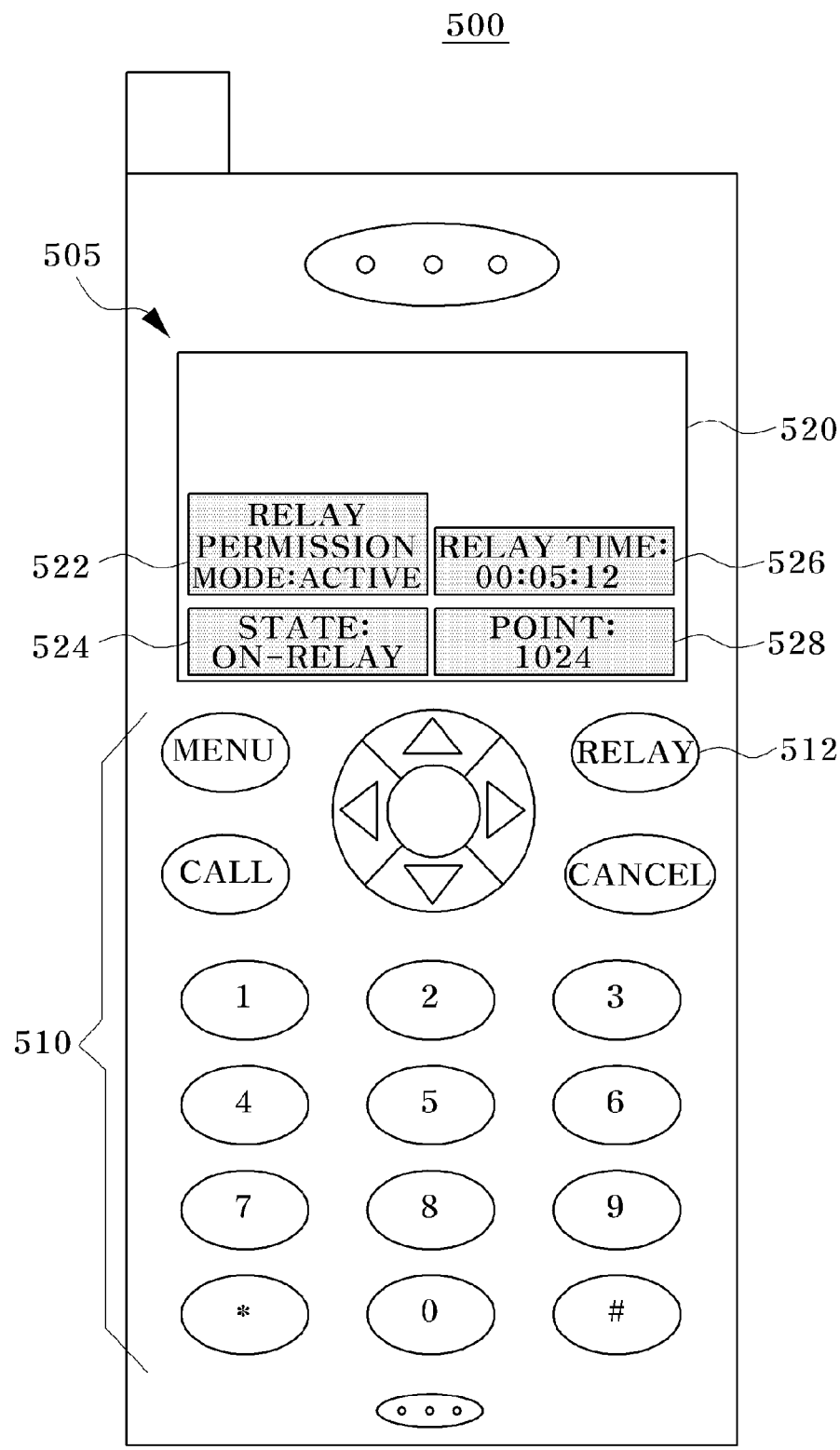
FIG. 5 shows a schematic diagram of an illustrative embodiment of a user terminal incorporating a user interface.

FIG. 5 shows a schematic diagram of an illustrative embodiment of a user terminal 500 incorporating a user interface 505. User terminal 500 functions in substantially a similar manner as user terminal 300 illustrated in FIG. 3. As depicted, user interface 505 may include a key pad 510 and a display unit 520. Keypad 510 may provide a dedicated key 512 and one or more general purpose keys such as, by way of example and as depicted in FIG. 5, directional arrow keys, a "MENU" key, a "CALL" key, a "CANCEL" key, and a twelve-key number pad. Dedicated key 512 may be used, for example, by a user, to activate or inactivate the relay permission function or mode on user terminal 500. In addition, a user may input one or more relay permission conditions using a general-purpose key or a combination of general purpose keys provided in the keypad 510. Display unit 520 may display or provide various relay information for viewing, for example, by a user. By way of example and as depicted, display unit 520 may display areas or boxes 522, 524, 526, and 528. Display area 522 displays information that indicates whether or not the relay function is provided by user terminal 500. Display area 524 displays information that indicates the current state (e.g., idle state, relay state, or communication state as described above, or any other operational state such as camera, call, etc.) of user terminal 500. Display area 526 displays the time taken for the current or most recently performed relay operation. Display area 528 displays information regarding an incentive received for allowing the relay function on user terminal 500.

Although user terminal 500 is shown as or in the shape of a mobile phone in FIG. 5, those of ordinary skill in the art will readily recognize that the above-described embodiments of user terminal 500 can be applied to another type of user terminal, such as a wireless communication enabled laptop, wireless communication enabled personal digital assistant (PDA) or wireless communication enabled game console (e.g., PSP, Nintendo DS, etc.).

Figure 6:
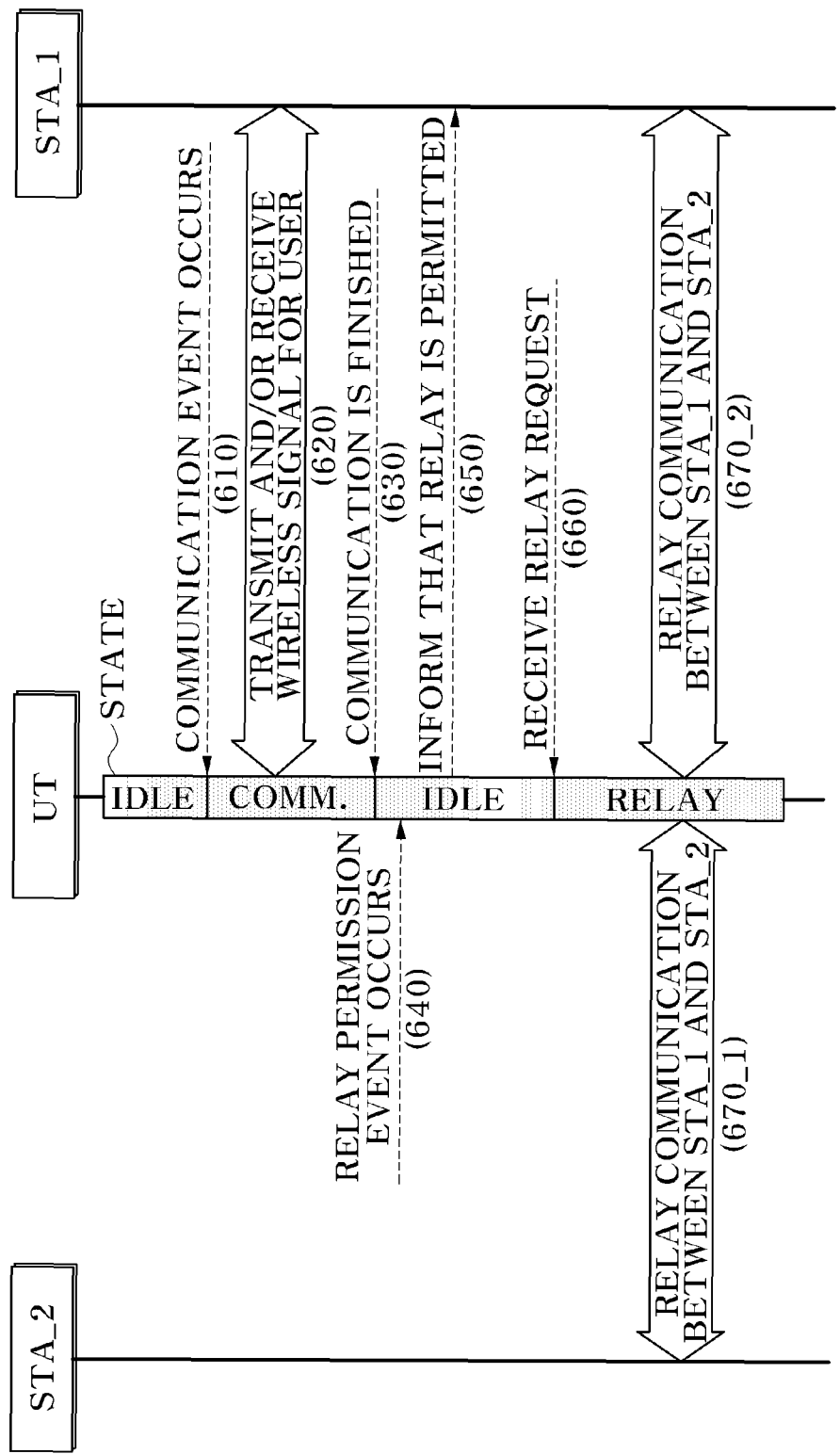
FIG. 6 shows a flow diagram of an illustrative embodiment of a communication method in a wireless communication system.

FIG. 6 shows a flow diagram of an illustrative embodiment of a communication method in a wireless communication system. As illustrated, a user terminal UT may initially be in the idle state.

In stage 610, in response to a communication event, the user terminal UT may transition from the idle state to the communication state. Accordingly, in stage 620, the user terminal UT may communicate with a remote wireless station, such as, without limitation, a first wireless station STA_1 or a second wireless station STA_1, proximate to the user terminal UT. Examples of the first wireless STA_1 or the second wireless station STA_2 may be a user terminal, a central station, etc. As one example, referring again to FIG. 1, when a need to transmit and/or receive a message to and/or from central station 120 occurs at first user terminal 110 while in the idle state, first user terminal 110 may transition from the idle state to the communication state and transmit and/or receive the message to and/or from (i.e., communicate with) central station 120. As another example, referring again to FIG. 2, when a need to transmit and/or receive a message to and/or from seventh user terminal 270 occurs at third user terminal 230 in the idle state, third user terminal 230 may make a transition from the idle state to the communication state and transmit and/or receive the message to and/or from (i.e., communicate with) seventh user terminal 270.

In stage 630, when the corresponding communication in stage 620 ends, the user terminal UT may make a transition from the communication state to the idle state. In stage 640, a relay permission event may occur at the user terminal UT based on or as a result of, for example but not limitation, user activation of the relay function or satisfaction of a previously specified relay permission condition or conditions as discussed above. As a result of the occurrence of the relay permission event, the user terminal UT may perform the relay function.

In stage 650, in response to the relay permission event, the user terminal UT may transmit a message (e.g., a broadcast message, a multicast message, etc.) informing recipients that relay function or operation is permitted on the user terminal UT. As one example, the user terminal UT may transmit the message to one or more wireless stations such as the first wireless station STA_1 or the second wireless station STA_2. As another example, the user terminal UT may broadcast the message for reception by devices proximate to the user terminal UT. In this way, wireless stations such as the first wireless station STA_1 and/or the second wireless station STA_2 may be informed of the relay functionality provided by the user terminal UT.

In stage 660, in response to a relay request from a remote wireless station, the user terminal UT may transition from the idle state to the relay state. As discussed above, the user terminal UT may perform a check to determine that relay functionality is permitted before transitioning from the idle state to the relay state. Accordingly, the user terminal UT may perform the corresponding relay in stages 670_1 and 670_2. As one example, in the communication system shown in FIG. 1, second user terminal 130 may be in the idle state and have relay functionality active. First user terminal 110 or central station 120 may request second user terminal 130 to relay a communication between first user terminal 110 and central station 120. In response, second user terminal 130 may make a transition from the idle state to the relay state, and relay the corresponding communication. As another example, referring again to FIG. 1, third user terminal 140 that is to relay a communication between first user terminal 110 and central station 120 may have a need to transition to another state such as a communication state or an idle state. In this instance, third user terminal 140 may request another user terminal in an idle state such as second user terminal 130 to take over the relay (i.e., transfer the relay operation to second user terminal 130). In response to the relay request from third user terminal 140, second user terminal 130, assuming that second user terminal 130 currently has relay functionality active, may make a transition to the relay state and perform the relay instead of third user terminal 140. As still another example, referring to FIG. 2, third user terminal 230 in the idle state and with relay functionality active, may receive a relay request from first user terminal 210 or second user terminal 220 to relay a communication between first user terminal 210 and second user terminal 220. In response to the relay request, third user terminal 230 may make a transition from the idle state to the relay state and relay the corresponding communication. As yet another example, referring again to FIG. 2, third user terminal 230 that is to relay a communication between first user terminal 210 and second user terminal 220 may have a need to transition to another state such as a communication state or an idle state. Third user terminal 230 may request another user terminal in an idle state such as fourth user terminal 240 to take over the relay. In response to the relay request from third user terminal 230, fourth user terminal 240, assuming that fourth user terminal 240 currently has relay functionality active, may make a transition to the relay state and perform the corresponding relay instead of third user terminal 230.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 7 shows a flow diagram of another illustrative embodiment of a communication method in a wireless communication system. As illustrated in stages 710_1 and 710_2, a user terminal UT may perform a relay between remote wireless stations such as, but not limitation, a first wireless station STA_1 and a second wireless station STA_2 proximate to the user terminal UT. By way of example, the first wireless STA_1 or the second wireless station STA_2 may include a user terminal, a central station, etc. When the relay ends (e.g., relay communication completes) in stage 720, the user terminal UT may make a transition from the relay state to the idle state.

In stage 730, a relay permission cancellation event may occur at the user terminal UT based on or as a result of, for example but not limitation, user inactivation of the relay function or failure of a previously specified relay permission condition as discussed above. As a result of the occurrence of the relay permission cancellation event, the user terminal UT may no longer perform the relay function.

In stage 740, in response to the relay permission cancellation event, the user terminal UT may transmit a message (e.g., a broadcast message, a multicast message, etc.) informing recipients that the relay function or operation is not available on the user terminal UT. As one example, the user terminal UT may transmit the message to one or more wireless stations such as the first wireless station STA_1 or the second wireless station STA_2. As another example, the user terminal UT may broadcast the message for reception by devices proximate to the user terminal UT. In this way, wireless stations such as the first wireless station STA_1 and/or the second wireless station STA_2 may be informed that the user terminal UT does not provide or is incapable of providing the relay function. Alternatively, the user terminal UT may not inform the wireless stations that the relay function is not available. Instead, when the user terminal UT receives relay requests from other wireless stations, the user terminal UT may respond with corresponding error messages and ignore the relay requests.

FIG. 8 shows a flow diagram of still another illustrative embodiment of a communication method in a wireless communication system. As illustrated in stages 810_1 and 810_2, a user terminal UT may perform a relay between remote wireless stations such as, but not limitation, a first wireless station STA_1 and a second wireless station STA_2 proximate to the user terminal UT. By way of example, the first wireless STA_1 or the second wireless station STA_2 may include a user terminal, a central station, etc.

In stages 820 and 830, in response to a communication event, the user terminal UT may hand over or transfer the relay to another wireless station (not shown) and the user terminal UT may transition from the relay state to the communication state. As one example, referring again to FIG. 1, while third user terminal 140 is to relay a communication between first user terminal 110 and central station 120, a need may arise for third user terminal 140 to transmit and/or receive a message to and/or from (i.e., communicate with) another communication device. In this instance, third user terminal 140 may request another wireless station that has relay functionality active such as second user terminal 130 to perform or complete the relay communication. In response, second user terminal 130 may take over the relay. Upon successful transfer of the relay to second user terminal 130, in stage 840, third user terminal 140 may transition from the relay state to the communication state and transmit and/or receive the message to and/or from the other communication device. As a result of the relay transfer or handover, seamless communication may be performed between first user terminal 110 and central station 120.

In another embodiment, in stage 820, in response to a communication event, the user terminal UT may transition from the relay state to the communication state without transferring or handing over the relay to another wireless station. In this case, the user terminal UT may complete the relay communication prior to performing the communication event. Alternatively, the user terminal UT may interrupt the relay, perform the communication event, and then return to and complete the relay communication.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A communication method in a wireless communication system, comprising:

transmitting to at least one of a first user terminal or a second user terminal and without involving a central station a message informing that a relay function or operation is permitted at a third user terminal in a decentralized communication system;

receiving information to determine whether or not to permit a relay of a communication between the first user terminal and the second user terminal at the third user terminal;

coordinating the relay of the communication at the third user terminal with the first user terminal and the second user terminal without assistance from the central station;

relaying the communication based on the received information as coordinated with the first user terminal and the second user terminal;

informing a user of an incentive for relaying the communication via a user interface of the third user terminal; and transmitting to at least one of the first user terminal or the second user terminal a message informing that a relay function or operation is not available in response to a relay permission cancellation event;

wherein:

the information comprises a relay permission condition specified by a user including at least one of an available battery capacity specified by the user, an available communication time specified by the user, or an idle time period specified by the user; and relaying the communication is initiated in response to a relay request from the first user terminal or the second user terminal received while the third user terminal is in an idle state.

2. The method of claim 1, wherein the information comprises a command for activating or inactivating a relay permission mode.

3. The method of claim 1, wherein relaying the communication comprises:
- determining whether or not to permit a relay based on the information; and
- when it is determined to permit the relay, relaying the communication in response to a relay request from the first wireless station or the second wireless station.

4. The method of claim 3, wherein relaying the communication comprises:
- transmitting to at least one of the first wireless station or the second wireless station a message informing that a relay function or operation is permitted; and
- relaying the communication in response to the relay request from one of the first wireless station or the second wireless station receiving the message.

5. A communication method in a wireless communication system, comprising:
- transmitting to at least one of a first user terminal or a second user terminal and without involving a central station a message informing that a relay function or operation is permitted at a third user terminal in a decentralized communication system;
- coordinating a relay of a communication with the first user terminal and with the second user terminal without assistance from the central station;
- determining whether or not to permit the relay based on information input by a user via a user interface of the third user terminal;
- when it is determined to permit the relay, relaying the communication through a transceiver of the third user terminal in response to a relay request from the first user terminal or the second user terminal;
- relaying the communication between the first user terminal and the second user terminal as coordinated with the first user terminal and the second user terminal, the communication being different than the message informing that a relay function or operation is permitted; and
- informing a user of an incentive for relaying the communication via the user interface of the third user terminal.

6. The method of claim 5, wherein the incentive comprises at least one of available free call time, available free data transmission capacity, a reduced communication fee rate, or credit points given in compensation for relaying the communication.

7. A user terminal in a wireless communication system, comprising:
- a user interface configured to allow a user to input information, the information used to determine whether or not to permit a relay;
- a transceiver configured to transmit or receive a signal and to transmit to at least one of a first user terminal or a second user terminal and without involving a central station a message informing that a relay function or operation is permitted at the user terminal; and
- a controller configured to:
  - coordinate a relay of a communication in a decentralized communication system with the first user terminal and with the second user terminal without assistance from the central station;
  - determine whether or not to permit the relay based on the information, and when it is determined to permit the relay, relay the communication through the transceiver in response to a relay request from the first wireless station or the second wireless station; and
  - relay the communication between the first user terminal and the second user terminal as coordinated with the first user terminal and the second user terminal, the communication being different than the message informing that a relay function or operation is permitted.

8. The user terminal of claim 7, wherein the information comprises a command for activating or inactivating a relay permission mode.

9. The user terminal of claim 8, wherein the user interface comprises a dedicated key used to input the command.

10. The user terminal of claim 7, wherein the information comprises a relay permission condition.

11. The user terminal of claim 7, further comprising a user interface that informs of an incentive for relaying the communication.

12. The user terminal of claim 11, wherein the incentive comprises available free call time, available free data transmission capacity, a reduced communication fee rate, or credit points given in compensation for relaying the communication.

* * * * *